D. H. HORNOR.
INTERNAL COMBUSTION ENGINE.
APPLICATION FILED SEPT. 5, 1914.

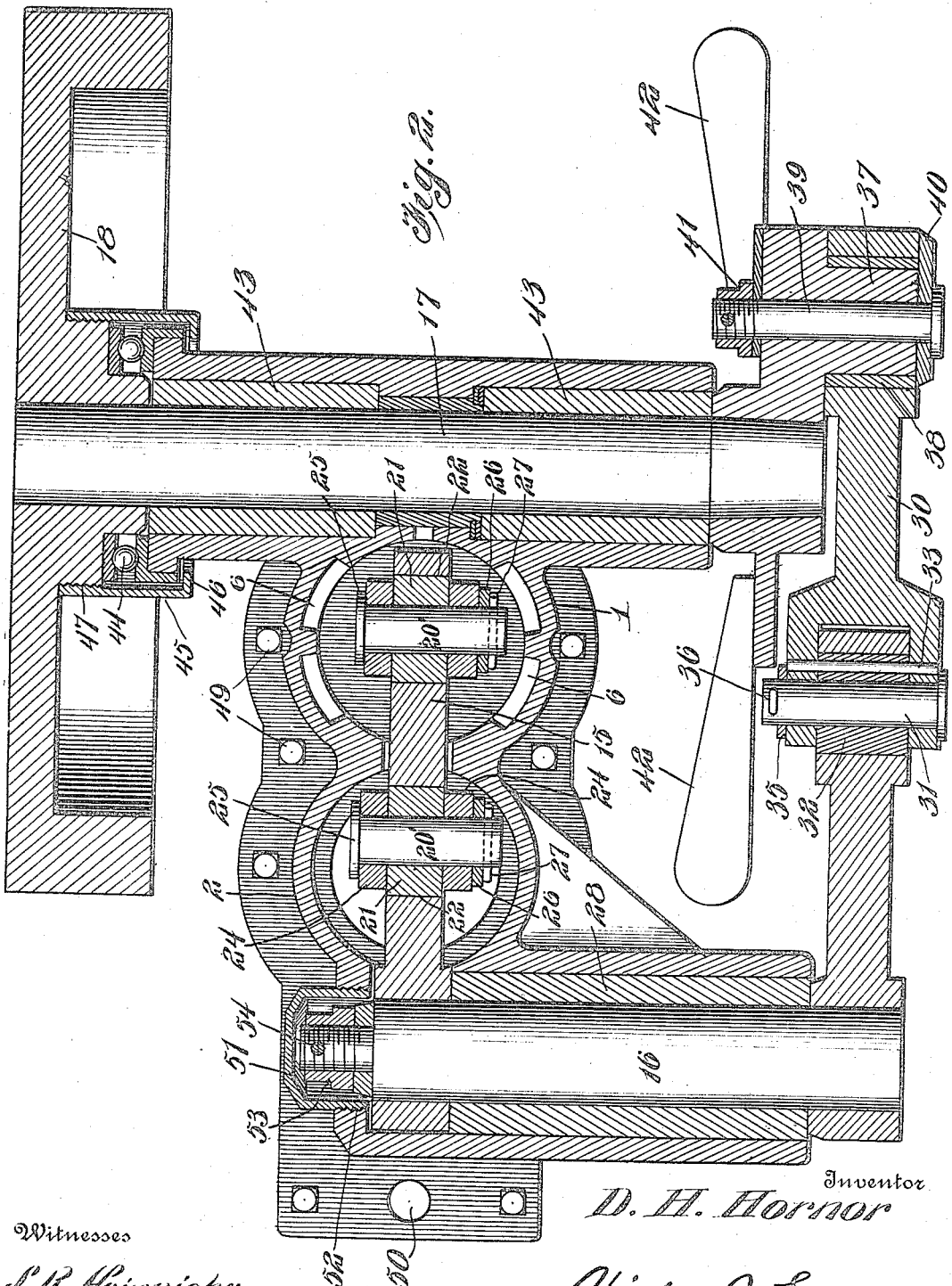

1,149,142.

Patented Aug. 3, 1915.
2 SHEETS—SHEET 1.

Witnesses
J. R. Heinrichs
R. M. Smith

Inventor
D. H. Hornor
By Victor J. Evans
Attorney

UNITED STATES PATENT OFFICE.

DAYTON H. HORNOR, OF ALPAUGH, CALIFORNIA.

INTERNAL-COMBUSTION ENGINE.

1,149,142.      Specification of Letters Patent.      Patented Aug. 3, 1915.

Application filed September 5, 1914. Serial No. 860,354.

*To all whom it may concern:*

Be it known that I, DAYTON H. HORNOR, a citizen of the United States, residing at Alpaugh, in the county of Tulare and State of California, have invented new and useful Improvements in Internal-Combustion Engines, of which the following is a specification.

Figure 1:
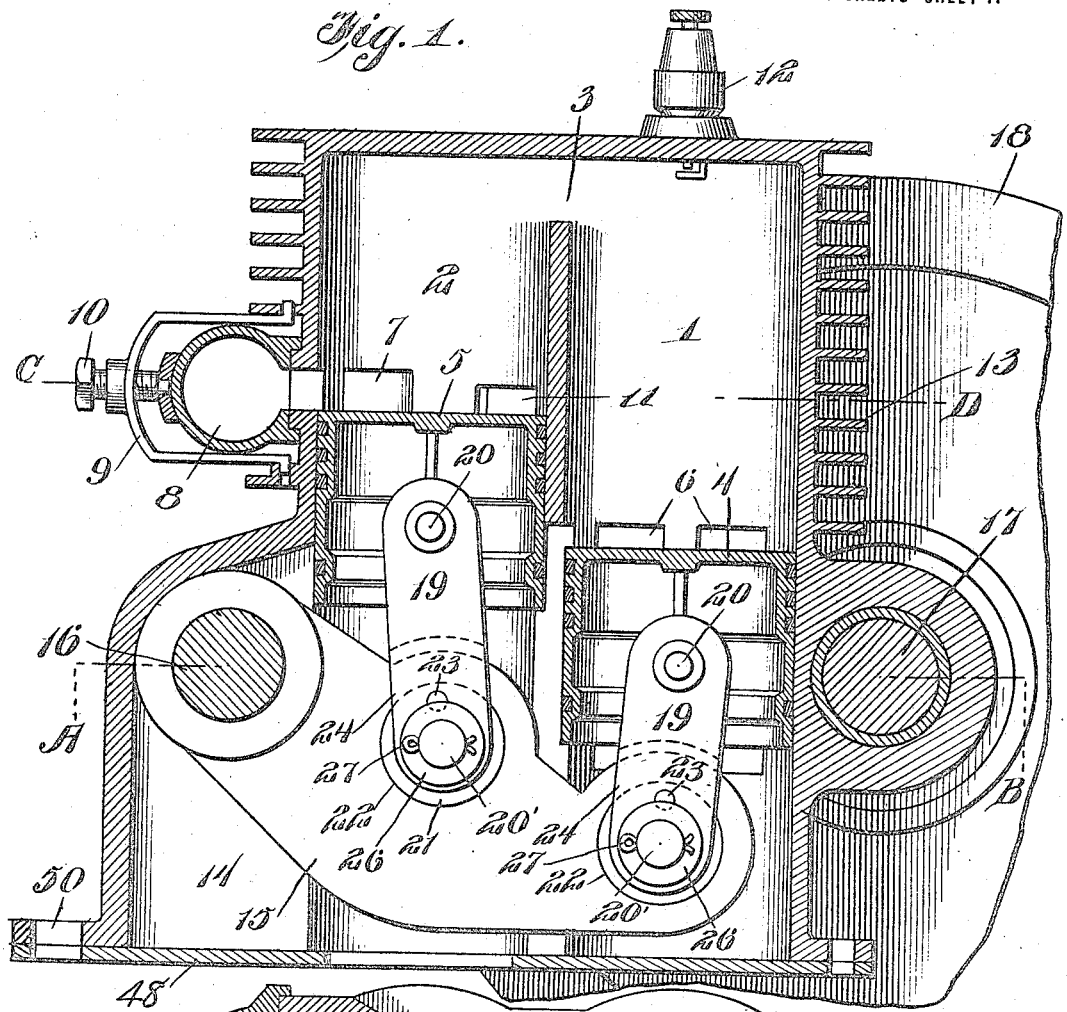
Figure 3:
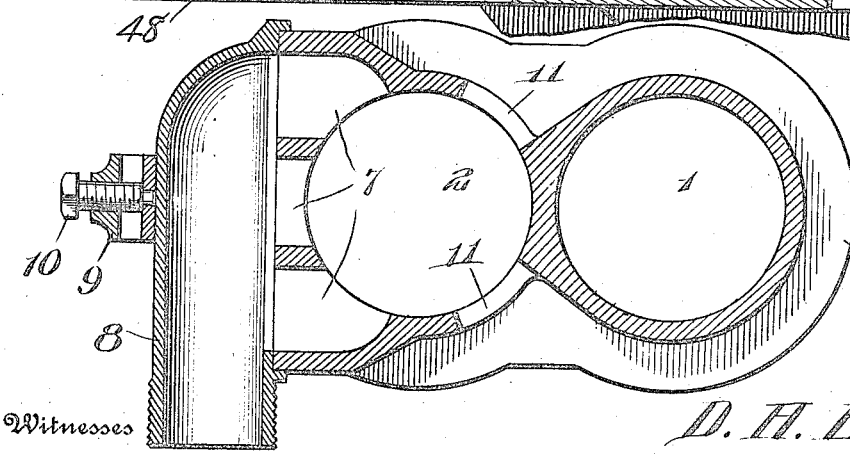

This invention relates to internal combustion engines and among the objects of the invention are first, to provide improved means whereby the power impulses of the pistons are transmitted to the power or crank shaft of the engine; second to provide means whereby the loss of any portion of the fresh charge may be prevented, thereby adding to the economy of the engine; third, to provide means whereby smaller charges or incomplete charges will be fired with more certainty than can be accomplished in engines of the reciprocatory piston type now in common use; fourth, to provide means whereby a rapid current of cold or fresh air is caused to circulate internally through the exhausting cylinder and across the head of the exhaust piston after each explosion, thus greatly improving the cooling of the parts and reducing the liability of back firing during the admission of the fresh charge. I attain these and other objects by the means illustrated in the accompanying drawings, in which:

Figure 1 is a vertical section through an engine embodying the present invention, said section being taken diametrically of the intake and exhaust cylinders. Fig. 2 is a horizontal section through the same on the line A—B of Fig. 1. Fig. 3 is a horizontal section on the line C—D of Fig. 1.

In carrying out the present invention, in the preferred embodiment thereof, I employ parallel cylinders 1 and 2, 1 designating what may be termed the intake cylinder and 2 the exhaust cylinder, said cylinders being connected at their outer ends by a communicating nozzle or neck 3. While the engine will be described as comprising two cylinders as hereinabove noted, it will of course be understood that such an engine may be considered merely as a power unit and that a multiple cylinder engine may be constructed embodying any multiple of the two cylinders hereinafter described.

Within the intake cylinder 1 is a reciprocatory piston 4, a like piston 5 being mounted to reciprocate in the cylinder 2. The cylinder 1 is provided with inlet ports 6 near the bottom thereof so as to be uncovered by the piston 4 at the inner end of its stroke to admit the explosive mixture to the cylinder 1, a circular series of such intake ports being shown. The exhaust cylinder 2 is provided with an arcuate series of exhaust ports 7 which communicate with a common exhaust pipe or manifold 8 arranged exteriorly of the cylinder 2 and shown as held in place by means of a stirrup 9 fastened to the cylinder, said stirrup carrying a binding screw 10 which bears against the pipe 8 and forces the same into gas-tight contact with the cylinder wall. In addition to the exhaust ports 7, the cylinder 2 is provided with a plurality of fresh or cold air intake ports 11 which are of less height or width than the exhaust ports 7 so that when the piston 5 moves inwardly, the exhaust ports 7 will first be uncovered, followed by the uncovering of the ports 11. 12 designates an igniter mounted in the head of the intake cylinder 1, said igniter being shown in the form of the conventional spark plug. The cylinders are shown as air cooled, being provided for that purpose with the usual air cooling fins or flanges 13.

The means for transmitting the motion and power of the pistons to the engine shaft will now be described. Arranged in the compression chamber 14 of what is usually the crank case of the engine, is a crank arm 15 shown as approximately of bell crank shape, said crank arm 15 being mounted fast on a countershaft 16 which is parallel to the engine shaft 17 on which the usual fly wheel 18 is mounted. The pistons 4 and 5 are connected to the crank arm 15 by means of links 19, said links being connected to the usual piston pins 20 and being connected at their opposite ends to the crank arm 15 by pins 20' which are inserted through bearings or bushings 21 journaled in openings 22 in the crank arm 15 and held from rotation relatively to the links 19 by means of pins or keys 23. Each of the links 19 has one end thereof forked as indicated at 24 to embrace the crank arm 15 and the adjacent bearing 21 while the pin 20 is provided at one end with a head 25 and adjacent to its opposite end with a washer 26 held in place by a cotter pin 27 or its equivalent. The countershaft is journaled in an extra long bushing 28 within the compression chamber 14 and has a lever arm 29 fast thereon exteriorly of the casing as indicated in Fig. 2. Connected to the extremity of the arm 29 is a connecting rod 30, the connection between the members 29 and 30 being formed by a pivot pin 31 which passes through a bushing 32 in the arm 29, said bushing being held in fixed relation to the connecting rod 30 by means of a pin or key 33 as shown in Fig. 2. This pin 31 is provided with a flanged head 34 at one end, and a washer 35 at the other end held by a cotter pin 36 or its equivalent. The connecting rod 30 is journaled at its opposite end on the crank 37 of the crank shaft 17, a bushing 38 surrounding the crank 37 and the parts being held in working relation by means of a pin 39, a washer 40 and a nut 41 threaded on one end of the pin or bolt 39.

42 designates a cooling fan fast on the shaft 17 and 43 designates extra long bushings in which the shaft 17 is journaled.

44 designates an end thrust bearing which is set into the hub of the fly wheel 18 when needed, 45 representing an oil retaining sleeve flanged as shown at 46 to retain oil or grease in and around the end thrust bearing 44. The sleeve 46 is threaded on the hub of the fly wheel as shown at 47. The bottom plate 48 of the compression chamber 14 is fastened in place by bolts 49 arranged at suitable places and intervals and holes 50 are provided at suitable points to receive the usual anchoring bolts or the bolts by which the engine is fastened to its supporting bed.

51 designates a gas-tight cap which is threaded into an opening in the said wall of the compression chamber as shown at 52. This cap 51 is removable to give access to the adjacent end of the countershaft 16 and the crank arm 15, said crank arm being held on the countershaft 16 by means of a nut 53 locked by means of a cotter pin 54 or equivalent means.

The operation of the engine will be understood in view of the preceding description taken in connection with the accompanying drawings. As the pistons move outwardly, a charge of gas is drawn through the carbureter (not shown) having a suitable check valve (not shown) into the space beneath the pistons. The pistons in moving inwardly, compress the charge ready for delivery through one or more by-passes and the intake ports 6 into the cylinder 1. As soon as the intake ports 6 are uncovered, the mixture compressed in the chamber 14 rushes into the combustion chamber of the intake cylinder 1 and forces its way upwardly filling said combustion chamber. The piston 4 now moves outwardly, compressing the mixture in the spaces 1, 2 and 3, at the same time drawing in another charge into the space below the pistons. The charge above the pistons is ignited as the pistons near the outer limit of their movement and the resulting explosion drives the pistons inwardly again. As the pistons move inwardly on their power stroke, the charge below the pistons is compressed ready for delivery; at the same time power is transmitted through the crank arm 15, countershaft 16, lever arm 19 and connecting rod 13 to the engine shaft 17. As the pistons approach the inner end of their stroke, the piston 2 first uncovers the exhaust ports 7, permitting the rapid escape of the burned gases and resulting in a partial vacuum of the cylinders. The piston 2 next uncovers the fresh or cold air ports 11 and said air rushes in through the ports 11 across the face of the piston 5 and out through the ports 7 into the exhaust pipe 8 and to the atmosphere, thus helping to scavenge the cylinder 2 and tending to cool the parts heated by the explosion. The piston 4 next uncovers the inlet ports 6 and a fresh charge is now admitted through said ports into the cylinder 1, forcing its way toward the head of the cylinder and filling the combustion chamber 1 at the same time displacing the burned gas therefrom through the communicating passage or neck 3 and crowding a part of the burned gas out through the ports 7 and 11. It will be observed that the inlet ports 6 are distributed around the circumference of the cylinder 1, there being no deflector or baffle plate or lip on the piston so that instead of being thrust upwardly, the entering charge converges toward the center, then rises, displacing the burned gas from the previous explosions but with little tendency to mix therewith. The quantity of the fresh charge is normally only about sufficient to fill the combustion chamber of the cylinder 1, hence there will be no loss of the fresh charge through the exhaust ports, which has heretofore constituted one of the well understood disadvantages and objections to engines of the two-cycle type since the fresh charge to be thus lost must entirely fill the combustion chamber of the cylinder 1, pass through the communicating space or neck 3 and downwardly through the combustion chamber of the cylinder 2 before it can pass outwardly through the ports 7 and 11. In case of back pressure through the pipe 8 due to an explosion in the muffler or other cause, such back pressure will be relieved through the ports 11 which are open at this time and cannot prevent the delivery of a fresh charge through the inlet ports 6. When running idle or when operating under a light load or when for any reason only a small charge is admitted, such small charge will be fired with certainty, since, owing to the relative proportions of the spaces 1, 2 and 3, when the pistons are near the cylinder heads, the space in the cylinder 1 which at this time is relatively small, will contain the major part of the fresh charge which will therefore be ignited.

The operations above referred to take place consecutively and result in repeated power impulses which are transmitted to the engine shaft 17 by the mechanical means hereinabove particularly described.

By means of the bell crank system of transmitting the power from the pistons to the engine shaft, the entire engine structure is considerably shortened as compared with the usual crank shaft and connecting rod of a usual type of engine where the connecting rods extend from the pistons to the crank shaft; furthermore the side thrust of the pistons is greatly decreased and instead of connecting rod seven or eight inches in length in an engine of given size, the links 19 need only be about two and three-quarter inches in length and in the greatest angularity of said links relatively to the major axes of the pistons will be equivalent to a connecting rod over forty inches in length constructed in the usual way. This renders it practicable to shorten the pistons while retaining equally good or better wearing qualities; it furthermore lightens the reciprocating parts, effecting a saving in weight in the pistons and links and also obtaining greater strength by reason of the decreased length of said connecting rods or links.

What I claim is:—

1. An internal combustion engine embodying in combination, a crank shaft, a countershaft parallel to said crank shaft, a lever arm on said countershaft, a connecting rod between said arm and crank shaft, companion cylinders arranged between said crank shaft and countershaft and one of which is formed with an intake port only and the other with an exhaust port, reciprocatory pistons in said cylinders, and a crank arm on said countershaft connected with and actuated by said pistons.

2. An internal combustion engine embodying in combination, a crank shaft, a countershaft parallel to said crank shaft, a lever arm on said countershaft, a connecting rod between said arm and crank shaft, companion cylinders arranged between said crank shaft and countershaft and one of which is formed with an intake port only and the other with an exhaust port, reciprocatory pistons in said cylinders working together in the same direction, and a crank arm on said countershaft connected with and actuated by said pistons.

3. An internal combustion engine embodying in combination, a compression base, a crank shaft, a countershaft parallel to said crank shaft, a lever arm on said countershaft, a connecting rod between said arm and crank shaft, two cylinders arranged between said crank shaft and countershafts, reciprocatory pistons in said cylinders, and a crank arm on said countershaft connected with and actuated by said pistons and extending diametrically of both cylinders, said countershaft and its crank arm being housed in the compression base.

4. An internal combustion engine embodying in combination, a crank shaft, a countershaft parallel to said crank shaft, a lever arm on said countershaft, a connecting rod between said arm and crank shaft, companion cylinders arranged between said crank shaft and countershaft and one of which is formed with an intake port only and the other with an exhaust port, reciprocatory pistons in said cylinders, and a crank arm on said countershaft having both pistons connected therewith at the same side of its axis of movement.

5. An internal combustion engine embodying in combination, a crank shaft, a countershaft parallel to said crank shaft, a lever arm on said countershaft, a connecting rod between said arm and crank shaft, parallel cylinders in communication at their outer ends, one of said cylinders having inlet ports only and the other having exhaust ports, reciprocatory pistons in said cylinders, and a crank arm on said countershaft connected with and actuated by said pistons.

6. In an internal combustion engine embodying in combination, a crank shaft, a countershaft parallel to said crank shaft, a lever arm on said countershaft, a connecting rod between said arm and crank shaft, parallel cylinders in communication at their outer ends, one of said cylinders having only inlet ports and the other having only exhaust ports and fresh air inlet ports movable simultaneously in the same direction, reciprocatory pistons in said cylinders, and a crank arm on said countershaft connected with and actuated by said pistons.

In testimony whereof I affix my signature in presence of two witnesses.

DAYTON H. HORNOR.

Witnesses:
W. A. LIVERS,
THORNTON G. ADAMS.